L. HUSSEY. 2 Sheets—Sheet 1.
Assignor to G. W. DONALDSON.
HEATING EXHAUST AND SUPERHEATING LIVE STEAM.
No. 10,632. Reissued Aug. 4, 1885.
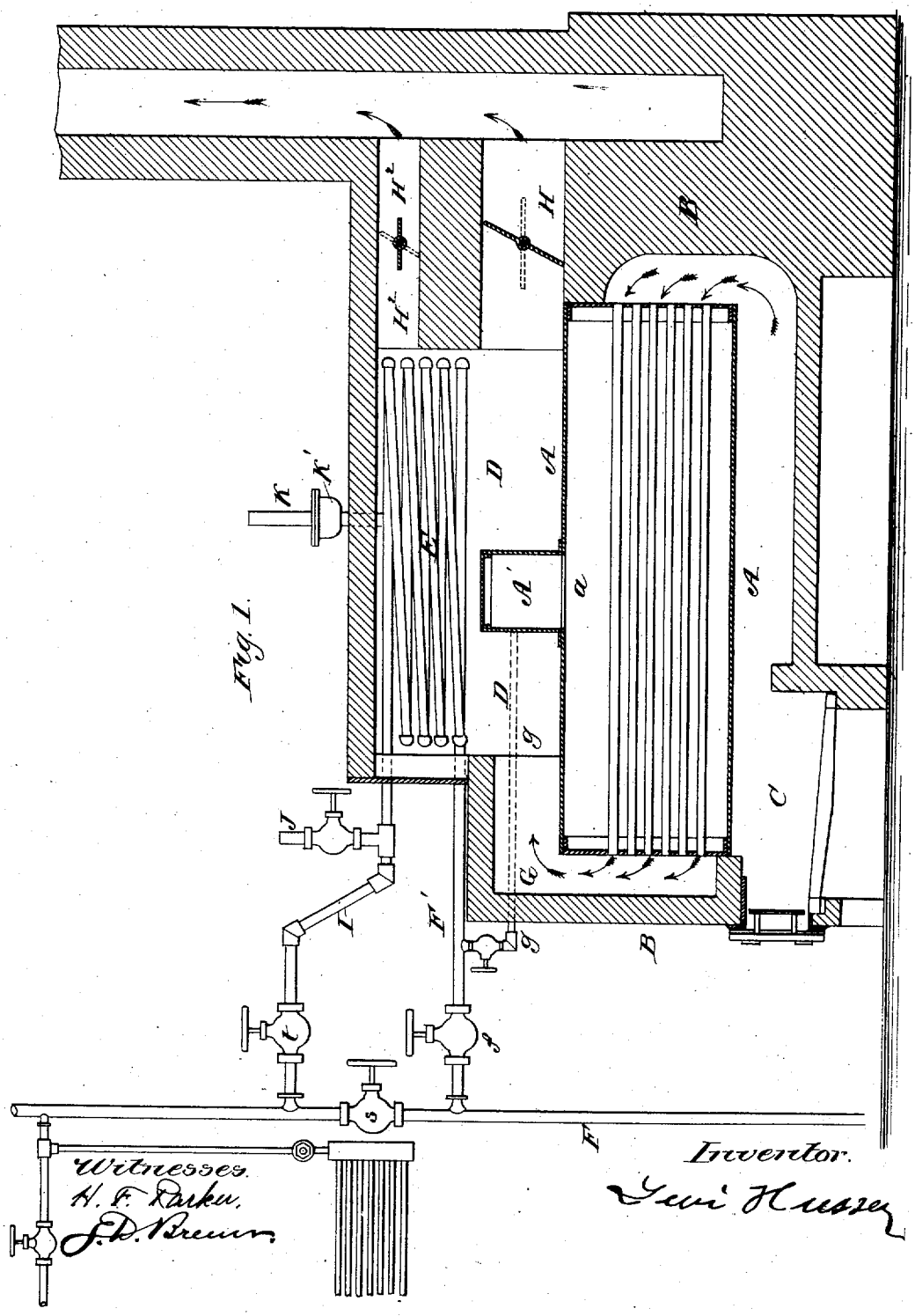

L. HUSSEY. 2 Sheets—Sheet 2.
Assignor to G. W. DONALDSON.
HEATING EXHAUST AND SUPERHEATING LIVE STEAM.
No. 10,632. Reissued Aug. 4, 1885.
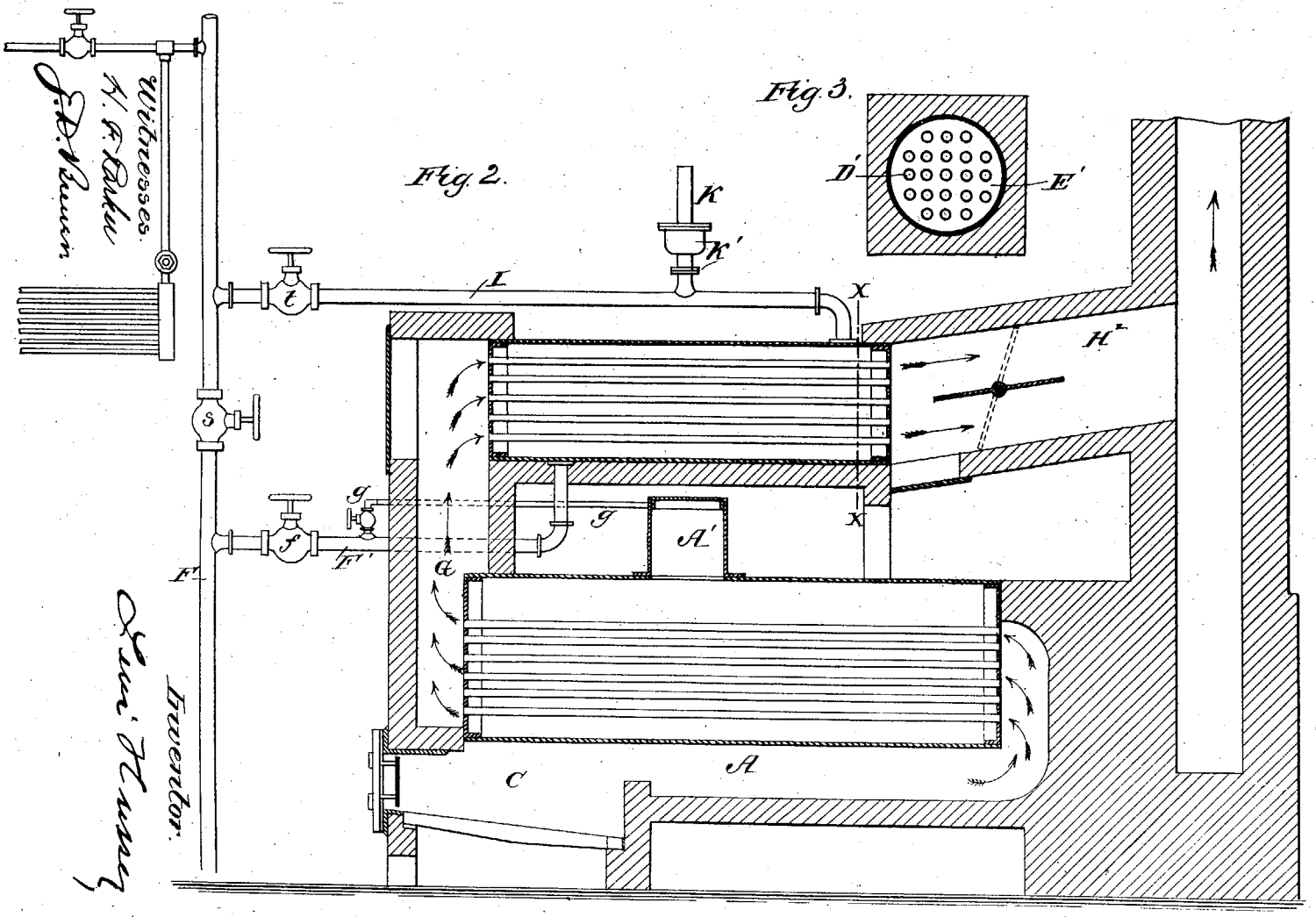

UNITED STATES PATENT OFFICE.

LEVI HUSSEY, OF NEW YORK, N. Y., ASSIGNOR TO GEORGE W. DONALDSON, OF SAME PLACE.

HEATING EXHAUST AND SUPERHEATING LIVE STEAM.

SPECIFICATION forming part of Reissued Letters Patent No. 10,632, dated August 4, 1885.

Original No. 279,247, dated June 12, 1883. Application for reissue filed May 26, 1885.

*To all whom it may concern:*

Be it known that I, LEVI HUSSEY, of the city, county, and State of New York, have invented certain new and useful Improvements in Apparatus for Reheating Exhaust-Steam and Superheating Live Steam, of which the following is a specification.

This invention relates to an apparatus for reheating exhaust-steam and also for superheating live steam when the engine from which the exhaust-steam is derived is not running, so that thereby a constant and uniform degree of heat can be supplied to drying-rooms or for other purposes.

The invention consists in the combination with a steam-boiler of an exhaust-steam-reheating or live-steam-superheating device, located within a flue through which the products of combustion pass, said device being connected with a valved exhaust-pipe of the steam-engine and with a valved live-steam pipe from the steam-boiler, whereby it may be readily converted from an exhaust-steam reheater to a live-steam superheater, and with a valved steam-conducting pipe which conveys the reheated exhaust-steam or the superheated live steam to the radiators or other appliances for utilizing the same.

The invention further consists in providing an enlargement in the flue through which the products of combustion pass, and combining therewith a steam-heating apparatus for reheating the exhaust steam from an engine or engines or for superheating live steam taken direct from steam-generators.

In the accompanying drawings, which illustrate my invention, Figures 1 and 2 represent vertical longitudinal sections of my improved apparatus for reheating exhaust-steam and superheating live steam, and Fig. 3 is a vertical transverse section through the system of heating-pipes shown in Fig. 2.

Similar letters of reference indicate corresponding parts.

Referring to the drawings, A represents a steam-boiler of any approved construction, and B the brick-work by which the same is supported. The products of combustion are conducted from the furnace C along the bottom and sides of the boiler to the rear end of the same, thence forward through the tubular flues of the boiler to a vertical flue, G, at the front end thereof, thence into an enlargement of the flue D, containing reheating-pipes E, supported therein in any suitable manner, and thence through the valved flue H or the valved flue $H^2$ to the chimney. A main exhaust-pipe, F, leading from the steam-engine, provided with a valve, *s*, connects with the radiator, feed-water heaters, or other devices for utilizing the exhaust-steam. A branch exhaust-pipe, F′, connects the main exhaust-pipe below the valve *s* with the lower end of the reheating-pipes E′, and a pipe, I, connects the upper end of said pipes with said main exhaust-pipe above said valve *s*. The branch exhaust-pipe is provided with a valve, *f*, and the pipe I is provided with a valve, *t*, and with a valved branch pipe, J, which may lead directly to a radiator or other exhaust-steam utilizing device. By closing the valve *s* of the main exhaust-pipe and opening the valve *f* of the branch exhaust-pipe the exhaust-steam will pass to and through the reheating-pipes, where it will become reheated, and thence through the pipe I back to the main exhaust-pipe or other pipe connected with the radiators, feed-water heaters, or other device for utilizing the said steam.

When the brick-work surrounding the system of pipes E or chamber E′ is properly heated by the fire of the furnace C, the heat absorbed by the brick walls is radiated and employed, in connection with the direct heat of the products of combustion that are drawn around the system of pipes E or through the chamber E′, for reheating the exhaust-steam to a considerably higher temperature, the same being then conducted off through a valved pipe, I, connected to the upper end of the heating-pipes E or chamber E′, for use in heating up drying-rooms and for other purposes. The pipe I, that conducts off the reheated steam, is provided with an outlet-pipe, K, having a pressure-relief valve, K′, so as to regulate the pressure in the system of heating-pipes and admit automatically the escape of steam of higher pressure.

Instead of locating the flue or chamber D immediately above the boiler, the vertical flue G may be extended, and instead of having a single flue, D, through which the gaseous products of combustion pass, and a series of small pipes, E, through which the exhaust-steam passes, there may be a series of small flues, D′, inclosed in a chamber, E′, as shown in Figs. 2 and 3, in which case the products of combustion may pass from the vertical flue G to the exhaust-flue through the small flues D′, while the exhaust-steam passes through said chamber E′ in contact with the outside of said pipes.

The system of heating-pipes E is further connected by a valve pipe, *g*, with a dome, A′, or with any other suitable part of the steam-boiler A, so that live steam may be made to pass through the system of heating-pipes E whenever the engine is stopped, either during the day or night. In this case the stop-cock *f* of the exhaust-pipe F is closed, and the valve of the live-steam pipe *g* is opened. The system of heating-pipes E acts then as a superheater of the live steam, and permits the lowering of the steam-pressure in the boiler to a very low point—say five pounds—thus insuring greater safety and a considerably smaller consumption of fuel, as the steam is superheated in passing through the system of pipes without extra cost by the heat of the products of combustion and the heat radiated by the brick walls. In this manner all the advantages obtained by carrying steam at a high pressure are secured for heating purposes without any danger or without any extra expense for fuel, simply by the heat that would otherwise pass off through the chimney.

By the apparatus described, drying-rooms or other apparatus requiring heat may be heated during the day by means of the reheated exhaust-steam, to which a high temperature is imparted in the system of heating-pipes, through which the same is conducted, while at night live steam of a low temperature is superheated in its passage through the heating-pipes without any expenditure of fuel, and applied for use in place of the reheated exhaust-steam. The exhaust-steam from the engine, as well as the heat of the products of combustion, which would otherwise pass off through the chimney, is thus utilized for economical and effective use in the arts, and thereby a considerable saving in fuel is obtained.

Having thus described my invention, I claim as new and desire to secure by Letters Patent—

1. The combination, with a steam-boiler, of a vertical flue at one end thereof, a flue or flues above the boiler, an exhaust-steam-reheating device within or around said flue or flues, a valved exhaust-steam pipe, a pipe connecting said exhaust-steam pipe with the reheating device, a valved live-steam pipe connecting the reheating device with the steam-boiler, and a pipe that conducts the reheated exhaust-steam or the superheated live steam from said heating device to the place of use, substantially as described.

2. In a device for reheating exhaust-steam and superheating live steam by the heated products of combustion while passing from the steam-generator to the uptake, the combination of enlargement or chamber D, located in the discharge-flue, a series of heating-pipes arranged in said chamber or enlargement, and suitable pipes and tubes for conducting and regulating the flow of exhaust-steam from the engine or other device and live steam from the boiler to and from the heating-pipes, substantially as and for the purpose set forth.

Dated New York, May 21, 1885.

LEVI HUSSEY.

Witnesses:

WM. P. ARNOLD,

G. D. BREWER.